(12) United States Patent
Kim et al.

(10) Patent No.: US 9,239,075 B2
(45) Date of Patent: Jan. 19, 2016

(54) FORGED CRANKSHAFT

(75) Inventors: Kisung Kim, Yao (JP); Hiroaki Tahira, Kizugawa (JP); Taketo Maejima, Amagasaki (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 244 days.

(21) Appl. No.: 13/703,814

(22) PCT Filed: Jun. 13, 2011

(86) PCT No.: PCT/JP2011/063490
§ 371 (c)(1),
(2), (4) Date: Dec. 12, 2012

(87) PCT Pub. No.: WO2011/158782
PCT Pub. Date: Dec. 22, 2011

(65) Prior Publication Data
US 2013/0087014 A1    Apr. 11, 2013

(30) Foreign Application Priority Data

Jun. 16, 2010   (JP) .................. 2010-137724

(51) Int. Cl.
| | |
|---|---|
| *F16C 3/06* | (2006.01) |
| *C21D 9/30* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/24* | (2006.01) |
| *C22C 38/28* | (2006.01) |
| *C22C 38/38* | (2006.01) |
| *C22C 38/60* | (2006.01) |
| *F16C 3/08* | (2006.01) |

(52) U.S. Cl.
CPC ... *F16C 3/06* (2013.01); *C21D 9/30* (2013.01); *C22C 38/001* (2013.01); *C22C 38/02* (2013.01); *C22C 38/04* (2013.01); *C22C 38/06* (2013.01); *C22C 38/24* (2013.01); *C22C 38/28* (2013.01); *C22C 38/38* (2013.01); *C22C 38/60* (2013.01); *F16C 3/08* (2013.01); *C21D 2211/005* (2013.01); *C21D 2211/009* (2013.01); *F16C 2204/64* (2013.01); *Y10T 74/2173* (2015.01)

(58) Field of Classification Search
CPC ........ C22C 38/04; C22C 48/02; C22C 33/00; C21D 2201/00; F16C 3/06
USPC ......................................................... 148/320
See application file for complete search history.

(56) References Cited

U.S. PATENT DOCUMENTS

| | | | |
|---|---|---|---|
| 5,985,044 A * | 11/1999 | Kurita et al. .................. | 148/226 |
| 2002/0139451 A1* | 10/2002 | Ishida et al. .................. | 148/333 |

FOREIGN PATENT DOCUMENTS

| | | |
|---|---|---|
| JP | 10-226847 | 8/1998 |
| JP | 2000-328193 | 11/2000 |

(Continued)

*Primary Examiner* — Jie Yang
(74) *Attorney, Agent, or Firm* — Clark & Brody

(57) ABSTRACT

To provide a forged crankshaft having an excellent wear resistance. The forged crankshaft according to the present embodiment includes a non-heat treated steel material. The non-heat treated steel material has a chemical composition which contains, by mass %, C: 0.45 to 0.70%, Si: 0.75 to 1.30%, Mn: 1.00 to 2.00%, S: 0.03 to 0.30%, Cr: 0.05 to 0.30%, Al: 0.005 to 0.050%, and N: 0.005 to 0.020%, the balance being Fe and impurities, and satisfies the following Formula (1):

$$1.1C + Mn + 0.2Cr > 2.0 \tag{1}$$

where a symbol of each element in Formula (1) is substituted by the content (mass %) of the each element. A matrix of the non-heat treated steel material is a ferrite-pearlite microstructure in which an area ratio of pro-eutectoid ferrite is less than 10% or a pearlite microstructure.

4 Claims, 2 Drawing Sheets

(56) References Cited

FOREIGN PATENT DOCUMENTS

| JP | 2002-256384 | | 9/2002 | |
| JP | 2005-264265 | | 9/2005 | |
| JP | 2005264265 | * | 9/2005 | ............. C22C 38/00 |
| JP | 2005-314756 | | 11/2005 | |
| JP | 2006-328513 | | 12/2006 | |
| JP | 2008-056956 | | 3/2008 | |

* cited by examiner (F=1.1C+Mn+0.2Cr)

FORGED CRANKSHAFT

TECHNICAL FIELD

The present invention relates to a crankshaft, and more particularly to a forged crankshaft which is used without a thermal refining treatment nor a surface hardening heat treatment after hot forging.

BACKGROUND ART

Recently, forged crankshafts for which thermal refining treatment is omitted have been provided. Thermal refining treatment is a quenching and tempering treatment for improving mechanical properties of steel such as strength. Hereafter, a forged crankshaft for which thermal refining treatment is omitted is also referred to as a "non-heat treated forged crankshaft."

The steel material constituting a non-heat treated forged crankshaft generally contains vanadium (V). A non-heat treated forged crankshaft is produced by hot forging the non-heat treated steel and allowing it to cool in the atmosphere. The microstructure of the steel material constituting the non-heat treated forged crankshaft is a ferrite-pearlite structure. Vanadium (V) remains in steel in the form of fine carbides and increases the strength and hardness of steel. In short, even without thermal refining treatment, a non-heat treated forged crankshaft containing vanadium has excellent strength and hardness. However, since vanadium is expensive, the manufacturing cost of non-heat treated forged crankshaft becomes high. Therefore, there is a need for a non-heat treated forged crankshaft having excellent strength and hardness even without containing vanadium.

Further, wear resistance is required for the surface of the forged crankshaft. A crank pin of the forged crankshaft is inserted into a large-end portion of a connecting rod. As the crankshaft rotates, the crank pin rotates via the inner surface of the large-end portion of the connecting rod and a slide bearing. Therefore, the surface of the crank pin is required to have excellent wear resistance.

JP2000-328193A and JP2002-256384A disclose a non-heat treated steel which is intended for improving wear resistance without addition of vanadium.

The non-heat treated steel for hot forging disclosed in JP2000-328193A has a ferrite-pearlite microstructure. Further, in the non-heat treated steel for hot forging, Si and Mn dissolve in ferrite thereby strengthening the ferrite. This is intended for improving wear resistance.

The non-heat treated steel for crankshaft disclosed in JP2002-256384 has a microstructure dominantly made up of pearlite with a pro-eutectoid ferrite fraction of less than 3%, and contains sulfides inclusions having a thickness of not more than 20 μm. Further, Si content is not more than 0.60%, and Al content is less than 0.005%. This is intended for improving wear resistance and machinability.

Meanwhile, to improve the wear resistance of a forged crankshaft, in general, a forged crankshaft is subjected to a surface hardening heat treatment. The surface hardening heat treatment includes, for example, an induction hardening treatment and a nitriding treatment. By an induction hardening treatment, a quenched layer is formed on the surface of a forged crankshaft. Moreover, by a nitriding treatment, a nitrided layer is formed on the surface of a forged crankshaft. The quenched layer and the nitrided layer have high hardness. Therefore, the wear resistance of the surface of the forged crankshaft is improved.

However, performing surface hardening heat treatment will result in an increase of manufacturing cost. Therefore, there is a need for a non-heat treated forged crankshaft which has excellent wear resistance even if vanadium is not contained and the surface hardening heat treatment is omitted.

A forged crankshaft manufactured by using a non-heat treated steel disclosed in JP2000-328193 and JP2002-256384 may exhibit a decline in wear resistance when the surface hardening heat treatment is omitted.

DISCLOSURE OF THE INVENTION

It is an objective of the present invention to provide a non-heat treated forged crankshaft which has excellent wear resistance even if it is used without a thermal refining treatment nor a surface hardening heat treatment after hot forging.

A forged crankshaft according to an embodiment of the present invention includes a non-heat treated steel material, in which the non-heat treated steel material has a matrix consisting of a ferrite-pearlite microstructure in which an area ratio of pro-eutectoid ferrite is less than 10% or a pearlite microstructure, and the non-heat treated steel material has a chemical composition containing, by mass %, C: 0.45 to 0.70%, Si: 0.75 to 1.30%, Mn: 1.00 to 2.00%, S: 0.03 to 0.30%, Cr: 0.05 to 0.30%, Al: 0.005 to 0.050%, and N: 0.005 to 0.020%, the balance being Fe and impurities, and which satisfies the following Formula (1):

$$1.1C+Mn+0.2Cr>2.0 \tag{1}$$

Where, a symbol of each element in Formula (1) is substituted by the content (mass %) of the each element.

In this case, the forged crankshaft does not contain vanadium (V) and has excellent wear resistance even if the surface hardening heat treatment such as an induction quenching treatment and a nitriding treatment is omitted.

The chemical composition of the non-heat treated steel material composes the above described forged crankshaft may contain Ti: not more than 0.03% in place of part of Fe.

Preferably, the forged crankshaft includes a crank pin for which the surface hardening heat treatment is omitted.

DESCRIPTION OF EMBODIMENT

Hereafter, with reference to the drawings, an embodiment of the present invention will be described in detail. Like or corresponding parts in the figures are given like reference symbols, and description thereof will not be repeated.

[Outline of Forged Crankshaft According to the Present Embodiment]

The present inventors have conducted investigation and analysis to improve the wear resistance, strength and hardness of a non-heat treated forged crankshaft in which a surface hardening heat treatment is omitted. As a result, the present inventors have obtained the following findings.

(A) The matrix of non-heat treated steel material constituting a forged crankshaft consists of a ferrite-pearlite microstructure in which the area ratio of pro-eutectoid ferrite is less than 10%, or a pearlite structure. Here, the "pro-eutectoid ferrite" means ferrite that precipitates from austenite prior to the eutectic transformation when the steel is cooled. Further, the "ferrite-pearlite microstructure" means a microstructure consisting of pro-eutectoid ferrite and pearlite, where the "pearlite microstructure" means substantially a single-phase microstructure of pearlite in which the area ratio of pro-eutectoid ferrite is 0%. In the description below, the area ratio of pro-eutectoid ferrite is referred to as a "pro-eutectoid ferrite ratio."

Pro-eutectoid ferrite is soft compared with pearlite, and the wear resistance of pro-eutectoid ferrite is low. If the pro-eutectoid ferrite ratio is less than 10%, a forged crankshaft has excellent wear resistance even if the surface hardening heat treatment is omitted.

(B) To obtain a ferrite-pearlite microstructure in which pro-eutectoid ferrite ratio is less than 10%, or a pearlite microstructure, the chemical composition of non-heat treated steel material constituting a forged crankshaft needs to satisfy Formula (1) below:

$$1.1C+Mn+0.2Cr>2.0 \quad (1)$$

Where, the symbol of each element in Formula (1) is substituted by the content (mass %) of the each element.

Any of carbon (C), manganese (Mn) and chromium (Cr) suppresses the precipitation of pro-eutectoid ferrite. If the contents of these elements satisfy Formula (1), the pro-eutectoid ferrite ratio of a forged crankshaft which is cooled after hot forging will be less than 10%, and an excellent wear resistance will be obtained.

(C) Si content is made to be 0.75 to 1.30%. Si strengthens ferrite within pearlite. Therefore, the strength and hardness of non-heat treated forged crankshaft will be improved even if vanadium (V) is not contained.

Based on the findings described so far, the present inventors have completed a forged crankshaft according to the present embodiment. Hereafter, the forged crankshaft according to the present embodiment will be described in detail.

[Configuration of Forged Crankshaft]

Figure 1:
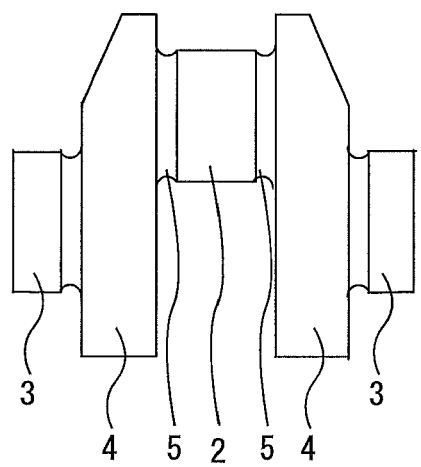
FIG. 1 is a diagram showing principal parts of a forged crankshaft according to an embodiment of the present invention.

FIG. 1 is a diagram showing principal parts of a forged crankshaft 1 according to the present embodiment. The forged crankshaft 1 includes a crank pin 2, a crank journal 3, and a crank arm 4. The crank arm 4 is disposed between the crank pin 2 and the crank journal 3, and is linked to the crank pin 2 and the crank journal 3. The forged crankshaft 1 further includes a fillet portion 5. The fillet portion 5 corresponds to a joint portion between the crank pin 2 and the crank arm 4.

The crank pin 2 is rotatably attached with a connecting rod (not shown). The crank pin 2 is disposed to be shifted from the rotational axis of the forged crankshaft 1. The crank journal 3 is disposed coaxial with the rotational axis of the forged crankshaft 1.

The crank pin 2 rotates via the inner surface of the large-end portion of the connecting rod and a slide bearing. Therefore, the surface of the crank pin 2 is required to have the wear resistance.

As described above, an ordinary forged crankshaft is subjected to a surface hardening heat treatment. The surface hardening heat treatment includes, for example, induction quenching treatment and nitriding treatment. A surface hardening heat treatment hardens the surface of the crank pin thereby improving wear resistance thereof.

However, the forged crankshaft 1 according to the present embodiment includes a crank pin 2 for which the surface hardening heat treatment is omitted. That is, the crank pin 2 is not subjected to the surface hardening heat treatment. This will reduce the manufacturing cost. Further, along with for the crank pin 2, the surface hardening heat treatment may be omitted for the crank journal 3 as well, or the surface hardening heat treatment may be omitted for the entire forged crankshaft 1.

The forged crankshaft 1 is produced by hot forging the non-heat treated steel material described below. This allows the forged crankshaft 1 to exhibit excellent wear resistance even if a surface hardening heat treatment thereof is omitted. Further, even if vanadium (V) is not contained, the forged crankshaft 1 has excellent strength and hardness. Hereafter, the chemical composition and microstructure of a non-heat treated steel material constituting the forged crankshaft 1, and a manufacturing method of the non-heat treated steel material will be described in detail.

[Chemical Composition]

The non-heat treated steel material constituting the forged crankshaft 1 has the following chemical composition. Hereafter, percentage relating to elements means mass %.

C: 0.45 to 0.70%

Carbon (C) reduces pro-eutectoid ferrite ratio in steel and increases the area ratio of pearlite in steel. This increases the strength and hardness of steel, and improves wear resistance thereof as well. When the C content is too low, the pro-eutectoid ferrite ratio exceeds 10% in the microstructure of steel. On the other hand, when the C content is too high, the steel is excessively hardened, thereby reducing the machinability of steel. Therefore, the C content is 0.45 to 0.70%. A preferable C content is 0.48 to 0.60%, and a more preferable one is 0.50 to 0.58%.

Si: 0.75 to 1.30%

Silicon (Si) dissolves in ferrite within pearlite, and strengthens the ferrite. Si further dissolves in pro-eutectoid ferrite as well, and strengthens the pro-eutectoid ferrite. Therefore, Si increases the strength and hardness of steel. Si also deoxidizes steel. When the Si content is too low, the strength and hardness of steel declines. On the other hand, when the Si content is too high, the steel is decarburized during hot forging. Therefore, the Si content is 0.75 to 1.30%. A preferable Si content is 0.90 to 1.20%.

Mn: 1.00 to 2.00%

Manganese (Mn) dissolves in steel and increases the strength and hardness of the steel. Mn further suppresses the production of pro-eutectoid ferrite. When the Mn content is too low, the pro-eutectoid ferrite ratio exceeds 10%. On the other hand, when the Mn content is too high, bainite is produced. Bainite reduces the wear resistance and machinability of steel. For this reason, the production of bainite is not preferable. Therefore, the Mn content is 1.00 to 2.00. A preferable Mn content is 1.20 to 1.70%, and a more preferable one is 1.30 to 1.50%.

S: 0.03 to 0.30%

Sulfur (S) produces sulfides such as MnS, thereby improving the machinability of steel. On the other hand, when the S content is too high, the hot workability of steel deteriorates. Therefore, the S content is 0.03 to 0.30%. A preferable S content is 0.04 to 0.06%.

Cr: 0.05 to 0.30%

Chromium (Cr) increases the strength and hardness of steel. Cr further suppresses the production of pro-eutectoid ferrite in steel. When the Cr content is too low, the pro-eutectoid ferrite ratio exceeds 10%. On the other hand, when the Cr content is too high, bainite is produced. Since bainite reduces the wear resistance and machinability of steel, the production of bainite is not preferable. Therefore, the Cr content is 0.05 to 0.30%. A preferable Cr content is 0.08 to 0.20%.

Al: 0.005 to 0.050%

Aluminum (Al) deoxidizes steel. Al further produces nitrides and refines grains. As the result of grain refining, the strength, hardness, and toughness of steel increase. On the other hand, when the Al content is too high, $Al_2O_3$ inclusions are produced. The $Al_2O_3$ inclusions deteriorate the machinability of steel. Therefore, the Al content is 0.005 to 0.050%. A preferable Al content is 0.010 to 0.040%. The Al content in the present embodiment is the content of acid-soluble Al (Sol. Al).

N: 0.005 to 0.020%

Nitrogen (N) produces nitrides and carbo-nitrides. Nitrides and carbo-nitrides refine grains, and further increase the strength, hardness and toughness of steel by precipitation strengthening. On the other hand, when the N content is too high, defects such as voids become more likely to occur in steel. Therefore, the N content is 0.005 to 0.020%. A preferable N content is 0.008 to 0.020%, and more preferable one is 0.012 to 0.018%.

The balance of the chemical composition of non-heat treated steel material constituting the forged crankshaft 1 consists of Fe and impurities. Here, the impurities refer to ores and scraps which are used as raw materials for steel, or elements which are mixed from the environments of production process. The impurities are, for example, phosphorus (P), oxygen (O), and the like.

The non-heat treated steel material constituting forged crankshaft 1 of the present invention may further contain Ti in place of part of Fe.

Ti: Not More Than 0.03% (Not Including 0%)

Ti forms nitrides and carbo-nitrides and refines grains of steel. Therefore, Ti increases the strength, toughness and fatigue strength of steel. On the other hand, when the Ti content is too high, a large amount of nitrides is produced, thereby deteriorating machinability of steel. Therefore, the Ti content is not more than 0.03% (not including 0%). When the Ti content is not less than 0.005%, the above described effects is noticeably obtained.

The non-heat treated steel material constituting the forged crankshaft 1 does not substantially contain vanadium (V). In short, V is an impurity in the non-heat treated steel material constituting the forged crankshaft 1, and preferably V is not contained. Even if V is not contained, since the Si content is high, the strength and hardness of the non-heat treated steel material is high.

[Microstructure]

The chemical composition of the non-heat treated steel material constituting the forged crankshaft 1 further satisfies Formula (1).

$$1.1C+Mn+0.2Cr>2.0 \qquad (1)$$

Where, the symbol of each element in Formula (1) is substituted by the content (mass %) of the each element.

As described above, any of C, Mn and Cr suppresses the production of pro-eutectoid ferrite. As the result of the chemical composition satisfying Formula (1), the matrix of the non-heat treated steel material constituting the forged crankshaft 1 becomes a ferrite-pearlite microstructure in which pro-eutectoid ferrite ratio is less than 10%, or a pearlite microstructure.

The pro-eutectoid ferrite ratio of the microstructure of the non-heat treated steel constituting the forged crankshaft 1 may be 0%, that is, a single-phase microstructure of pearlite. Hereafter, the relationship between Formula (1) and pro-eutectoid ferrite ratio will be described.

Figure 2:
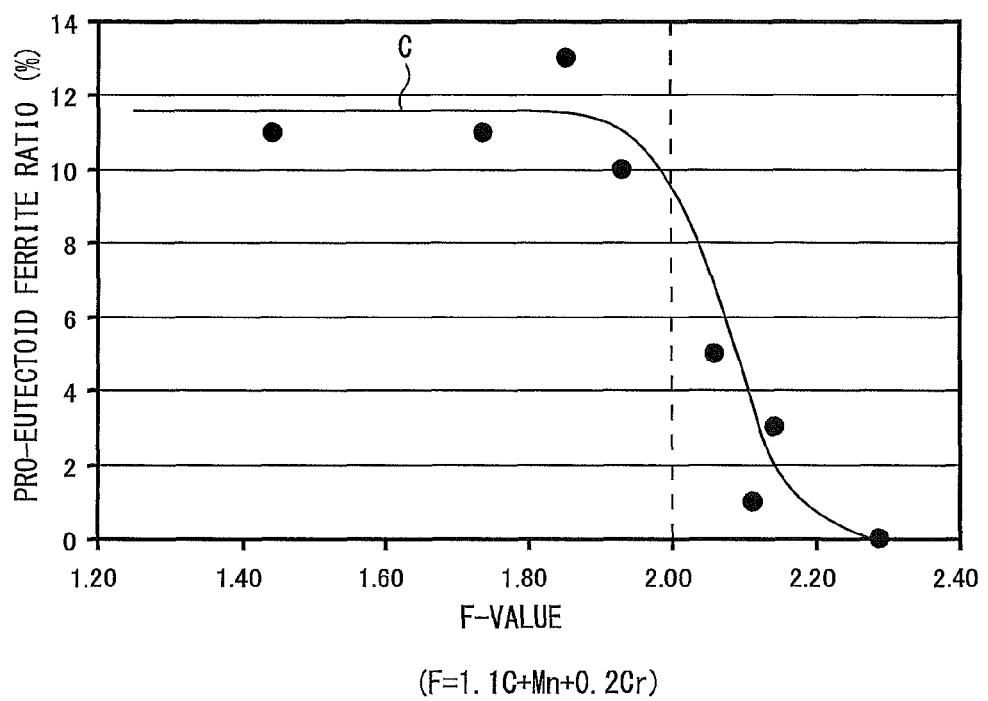
FIG. 2 is a diagram showing a relationship between the amounts of C, Mn, and Cr of a non-heat treated steel material that makes up the forged crankshaft shown in FIG. 1, and an area ratio of pro-eutectoid ferrite.

FIG. 2 is a diagram showing the relationship between the F-value shown by Formula (2) and pro-eutectoid ferrite ratio.

$$F=1.1C+Mn+0.2Cr \qquad (2)$$

Formula (2) is a mathematical expression among the C content, Mn content, and Cr content in the non-heat treated steel material, and is the left-hand side of Formula (1). FIG. 2 has been obtained by the below described method.

A plurality of steels each having a different C content, Mn content and Cr content were melt to produce ingots of 50 kg. The plurality of produced ingots were heated to 1250° C. The plurality of heated ingots were subjected to hot forging to produce a plurality of round-bar forged products having an outer diameter of 50 mm. Hereafter, a round-bar forged product is simply referred to as a "round bar."

In each of the round bars produced, a specimen for microstructure observation (hereafter, referred to as a "micro-specimen") was sampled from an intermediate position (hereafter, referred to as R/2) between the central axis and the surface. Using the sampled micro-specimen, the microstructure of each round bar was observed. More specifically, the surface of each micro-specimen was mirror-polished. Then, the surface of the polished micro-specimen was etched with a Nital etch solution. The surface of the etched micro-specimen was observed with an optical microscope.

Any of produced round bars had a matrix of ferrite-pearlite microstructure, or a pearlite microstructure. Then, the pro-eutectoid ferrite ratio of each round bar was measured. More specifically, a respective region of 0.03 mm$^2$ (150 μm×200 μm/field of view) was observed for arbitrary 20 fields of view by an optical microscope with a magnification of 400 times. The microphotograph (a magnification of 400 times) of each region was image processed to determine the area ratio of pro-eutectoid ferrite which constitutes each region. An average value of the determined 20 area ratios of pro-eutectoid ferrite was defined as the area ratio of pro-eutectoid ferrite (that is, the pro-eutectoid ratio in units of percent).

Based on the pro-eutectoid ferrite ratio obtained by the method described above, FIG. 2 was obtained. The abscissa of FIG. 2 shows the F-value defined by Formula (2). The ordinate of FIG. 2 shows the pro-eutectoid ferrite ratio (%). Referring to FIG. 2, when the F-value is more than 1.4 and not more than 2.0, the pro-eutectoid ferrite ratio is not less than 10%. Moreover, even if the F-value increases, the pro-eutectoid ferrite ratio does not greatly change. On the other hand, if the F-value exceeds 2.0, the pro-eutectoid ferrite ratio becomes less than 10%. Then, as the F-value increases, the pro-eutectoid ferrite ratio rapidly declines. Further, if the F-value exceeds 2.25%, the pro-eutectoid ferrite ratio becomes 0%. In short, a curve "C" in FIG. 2 has an inflection point in the vicinity of the F-value=2.0.

Therefore, if the chemical composition of non-heat treated steel material satisfies Formula (1), the matrix of the non-heat treated steel material becomes a ferrite-pearlite microstructure in which the pro-eutectoid ferrite ratio is less than 10%, or a pearlite microstructure. Since the forged crankshaft 1 is produced by being hot forged, the matrix of the forged crankshaft 1 will become a ferrite-pearlite microstructure in which the pro-eutectoid ferrite ratio is less than 10%, or a pearlite microstructure. A preferable F-value is not less than 2.05.

Making the microstructure of the non-heat treated steel material be such a microstructure allows the forged crankshaft 1 to have excellent wear resistance. Therefore, even if a surface hardening heat treatment to the surface of the crank pin 2 is omitted, the wear resistance of the crank pin 2 will be high.

Further, the non-heat treated steel material that makes up the forged crankshaft 1 contains no vanadium (V), and thermal refining treatment is omitted. However, having the above described chemical composition and satisfying Formula (1) allow the forged crankshaft 1 to have high strength and hardness.

[Production Method]

An example of the method for producing a forged crankshaft will be described.

Molten steel of the above described chemical composition is produced. The molten steel is cast into a cast piece by a continuous casting process. The molten steel may be formed into an ingot by an ingot-making process. The cast piece or ingot may be subjected to hot working to form a billet or a steel bar.

Next, the cast piece, ingot, billet, or steel bar is hot forged and cooled in the atmosphere to produce an intermediate product having a rough shape of crankshaft. The intermediate product of crankshaft will not be subjected to thermal refining treatment. That is, the intermediate product of crankshaft is not thermally refined. The intermediate product of crankshaft is cut into a predetermined shape by machining to produce a forged crankshaft 1.

In the produced forged crankshaft 1, at least the crank pin 2 is omitted from the surface hardening heat treatment. That is, at least the surface of the crank pin 2 is neither subjected to an induction quenching treatment, nor to a nitriding treatment. Further, the fillet portion 5 may be subjected to a fillet rolling processing to improve the surface hardness of the fillet portion 5 by work hardening. In the fillet rolling processing, a roller is pressed against the surface of the fillet portion 5 while the forged crankshaft 1 is rotated. As the result of this, the surface of the fillet portion 5 is subjected to plastic working, thereby being work hardened. The fillet portion 5 may not be subjected to fillet rolling processing.

The matrix of the non-heat treated steel material constituting the forged crankshaft 1 produced by the above described processes consists of a ferrite-pearlite microstructure in which the pro-eutectoid ferrite ratio is less than 10%, or a pearlite microstructure. Therefore, even if vanadium (V) is not contained and the thermal refining treatment and the surface hardening heat treatment are omitted, the surface of the forged crankshaft 1 has excellent wear resistance, and the forged crankshaft 1 has excellent strength and hardness.

EXAMPLES

Steels of Nos. 1 to 10 having chemical compositions shown in Table 1 were melted in a vacuum induction heating furnace to obtain molten steel. The molten steel was subjected to an ingot-making process to produce a columnar ingot. The produced ingot had a weight of 50 kg, and an outer diameter of 100 mm.

TABLE 1

| | Chemical Composition (in units of mass %, and the balance is Fe and impurities) | | | | | | | | |
|---|---|---|---|---|---|---|---|---|---|---|
| No. | C | Si | Mn | Cr | Ti | Al | S | N | V | F-value |
| 1 | 0.49 | 0.94 | 1.50 | 0.10 | — | 0.012 | 0.064 | 0.0072 | — | 2.06 |
| 2 | 0.54 | 0.99 | 1.49 | 0.28 | — | 0.035 | 0.057 | 0.0088 | — | 2.14 |
| 3 | 0.54 | 1.00 | 1.50 | 0.09 | 0.024 | 0.034 | 0.056 | 0.0097 | — | 2.11 |
| 4 | 0.70 | 0.93 | 1.50 | 0.09 | — | 0.013 | 0.061 | 0.0070 | — | 2.29 |
| 5 | 0.48 | 1.01 | 1.22 | 0.10 | — | 0.020 | 0.062 | 0.0122 | — | 1.77 |
| 6 | 0.47 | 0.54 | 0.90 | 0.12 | — | 0.039 | 0.054 | 0.0092 | 0.084 | 1.44 |
| 7 | 0.38 | 0.70 | 1.40 | 0.18 | 0.003 | 0.005 | 0.050 | 0.0034 | 0.120 | 1.85 |
| 8 | 0.39 | 0.58 | 1.48 | 0.12 | 0.003 | 0.003 | 0.067 | 0.0191 | — | 1.93 |
| 9 | 0.43 | 0.27 | 1.23 | 0.17 | 0.004 | 0.002 | 0.048 | 0.0095 | 0.100 | 1.74 |
| 10 | 0.38 | 0.33 | 0.86 | 1.19 | — | 0.040 | 0.012 | 0.0082 | — | 1.52 |

The "F-value" column in Table 1 shows an F-value of steel of each number which is calculated based on Formula (2). Referring to Table 1, the chemical compositions of steel No. 1 to No. 4 were within the range of the chemical composition of the non-heat treated steel material for crankshaft according to the present embodiment. Moreover, none of the chemical compositions No. 1 to No. 4 contained vanadium (V). The chemical compositions of No. 1 to No. 4 satisfied Formula (1). That is, F-values of No. 1 to No. 4 exceeded 2.0.

The composition of steel No. 5 was within the range of the chemical composition of the non-heat treated steel material according to the present embodiment. However, the chemical composition of steel No. 5 did not satisfy Formula (1). That is, the F-value of No. 5 was less than 2.0.

Further, the chemical compositions of steels Nos. 6 to 10 were out of the range of the chemical composition of the non-heat treated steel material according to the present embodiment, and did not satisfy Formula (1).

Ingots of each number were hot forged to produce forged products. To be specific, each ingot was heated to 1250° C. by a well-known heating furnace. The heated ingot was hot forged to produce a forged product of round bar having an outer diameter of 50 mm (hereafter, simply referred to as a round bar). The finishing temperature during hot forging was 1000° C. After hot forging, the round bar was cooled in the atmosphere. After cooling, the round bar was not subjected to thermal refining treatment. Further, the surface of the round bar was not subjected to a surface hardening heat treatment such as induction quenching treatment and nitriding treatment.

[Microstructure Investigation]

A micro-specimen was sampled from a round bar of each number, and the microstructure was observed. A micro-specimen for microstructure observation was sampled from the R/2 position of the round bar. The surface of the sampled micro-specimen was mirror polished. After polishing, the surface of the micro-specimen was etched with a Nital etch solution. After etching, the microstructure of the etched surface was observed with an optical microscope of a magnification of 400 times.

As a result of observation, any of the matrices of the round bars No. 1 to No. 9 was a ferrite-pearlite microstructure or a pearlite microstructure. On the other hand, the matrix of No. 10 was substantially a single phase of martensite. Then, the pro-eutectoid ferrite ratios in the microstructure of the round bars No. 1 to 10 were determined based on the above described method. Specifically, a respective region of 0.03 mm² (150 μm×200 μm/field of view) was observed for arbitrary 20 fields of view by an optical microscope with a magnification of 400 times. The microphotograph (magnification of 400 times) of each region was image processed to determine the area ratio of pro-eutectoid ferrite which constitutes each region. An average value of the determined 20 area ratios of pro-eutectoid ferrite was defined as the pro-eutectoid ferrite ratio (%).

[Surface Hardness Investigation]

The surface hardness was investigated on the round bars No. 1 to No. 10. Specifically, a Rockwell hardness test using the C scale was conducted according to JIS Z2245.

[Wear Resistance Investigation]

A pin-on-disk test was conducted to investigate the wear resistance of round bars No. 1 to No. 10. Specifically, a specimen of 1.5 mm×2.0 mm×3.7 mm was sampled from each round bar. The surface of 2.0 mm×3.7 mm (hereafter, referred to as a "principal plane") of each specimen was parallel with a cross section of the round bar. That is, the normal line to the principal plane of each specimen was parallel with the central axis of round bar. The weight of specimen before test was measured.

An emery paper of grit 800 was stuck on the surface of the rotary disk of the pin-on-disk tester. Then, the rotary disk was rotated at a circumferential speed of 39.6 m/min for 50 minutes while the principal plane of specimen was pressed against the emery paper at an interfacial pressure of 26 gf/mm².

After rotating for 50 minutes, the weight of specimen was measured. Then, the difference in weight between before and after testing was defined as the amount of wear (g).

[Investigation Results]

Investigation results are shown in Table 2.

TABLE 2

| No. | Microstructure | Pro-eutectoid ferrite ratio (%) | HRC | Amount of wear (g) |
|---|---|---|---|---|
| 1 | Ferrite-Pearlite | 5 | 23.4 | 0.0085 |
| 2 | Ferrite-Pearlite | 3 | 26.2 | 0.0083 |
| 3 | Ferrite-Pearlite | 1 | 25.5 | 0.0081 |
| 4 | Pearlite | 0 | 31.2 | 0.0081 |
| 5 | Ferrite-Pearlite | 12 | 21.3 | 0.0125 |
| 6 | Ferrite-Pearlite | 11 | 22.0 | 0.0112 |
| 7 | Ferrite-Pearlite | 13 | 24.3 | 0.0130 |
| 8 | Ferrite-Pearlite | 10 | 20.6 | 0.0105 |
| 9 | Ferrite-Pearlite | 11 | 23.3 | 0.0110 |
| 10 | Martensite | 0 | 32.4 | 0.0119 |

The "Microstructure" column in Table 2 shows the microstructure of each number. The "Pro-eutectoid ferrite ratio (%)" shows a pro-eutectoid ferrite ratio (%) of each number obtained by the microstructure testing. The "HRC" column shows the surface hardness (HRC) of each number obtained by Rockwell Hardness testing using scale C. The "Amount of wear (g)" column shows the amount of wear (g) of each number obtained by the pin-on-disk test.

Referring to Table 2, as described above, the matrix of any of round bars Nos. 1 to 3, and Nos. 5 to 9 was ferrite-pearlite microstructure, and the matrix of No. 4 was pearlite microstructure. On the other hand, since the round bar No. 10 had a high Cr content, the matrix of No. 10 consisted of a martensite microstructure.

The chemical compositions of Nos. 1 to 4 were within the range of the chemical composition of the non-heat treated steel material according to the present embodiment, and satisfied Formula (1). Therefore, the pro-eutectoid ferrite ratio was less than 10%. The amount of wear of any of No. 1 to No. 4 was less than 0.0100 g, thus exhibiting excellent wear resistance. Further, the Rockwell hardnesses HRCs of Nos. 1 to 4 were not less than 23.0, and Nos. 1 to 4 each had high strength and hardness.

On the other hand, although the chemical composition of No. 5 was within the range of the chemical composition of the non-heat treated steel material according to the present embodiment, it did not satisfy Formula (1). Therefore, the pro-eutectoid ferrite ratio was not less than 10%. Moreover, the Rockwell hardness HRC of No. 5 was less than 23.0 and the amount of wear exceeded 0.0100 g.

The chemical compositions of Nos. 6 to 9 were out of the range of chemical composition of the non-heat treated steel material according to the present embodiment, and moreover, did not satisfy Formula (1). As a result, the pro-eutectoid ferrite ratios in the microstructures of Nos. 6 to 9 were not less than 10%. Further, the amounts of wear of Nos. 6 to 9 exceeded 0.0100 g.

Since the matrix of the round bar No. 10 consisted of a martensite microstructure, the Rockwell hardness HRC was high. However, the amount of wear exceeded 0.0100 g.

Although the embodiment of the present invention has been described so far, the above described embodiment is merely exemplification for carrying out the present invention. Therefore, the present invention will not be limited to the above described embodiment and can be carried out by appropriately modifying the above described embodiment within a range not departing from the spirit thereof.

The invention claimed is:

1. A forged crankshaft comprising a non-heat treated steel material, wherein the non-heat treated steel material has a chemical composition which contains, by mass %, C: 0.45 to 0.70%, Si: 0.75 to 1.30%, Mn: 1.20 to 2.00%, S: 0.03 to 0.30%, Cr: 0.05 to 0.30%, Al: 0.005 to 0.050%, and N: 0.005 to 0.020%, the balance being Fe and impurities, and satisfies Formula (1), and wherein a matrix of the non-heat treated steel material is one of a ferrite-pearlite microstructure in which an area ratio of pro-eutectoid ferrite is less than 10% or a pearlite microstructure:

$$1.1C+Mn+0.2Cr>2.0 \quad (1)$$

where a symbol of each element in Formula (1) is substituted by the content (mass %) of the each element, the forged crankshaft has a surface hardness obtained by Rockwell Hardness testing using the scale C of not less than 23.0, and the forged crankshaft has a wear resistance where a difference in weight between before and after a pin-on-disk test is not more than 0.0100 g, the pin-on-disk test being conducted by preparing a specimen of 1.5 mm×2.0 mm×3.7 mm sampled from the forged crankshaft, and pressing a surface of 2.0 mm×3.7 mm of the specimen against an emery paper of grit 800 stuck on a surface of a rotary disk rotating at a circumferential speed of 39.6 m/min for 50 min at an interfacial pressure of 26 gf/mm².

2. The forged crankshaft according to claim 1, wherein the chemical composition of the non-heat treated steel material contains Ti: no more than 0.03% in place of part of Fe.

3. The forged crankshaft according to claim 2, wherein the forged crankshaft includes a crank pin for which a surface hardening heat treatment is omitted.

4. The forged crankshaft according to claim 1, wherein the forged crankshaft includes a crank pin for which a surface hardening heat treatment is omitted.

* * * * *